United States Patent
Chen (10) Patent No.: US 10,964,043 B2
(45) Date of Patent: Mar. 30, 2021

(54) METHOD AND MEASUREMENT SYSTEM FOR MEASURING DIMENSION AND/OR VOLUME OF AN OBJECT BY ELIMINATING REDUNDANT VOXELS

(71) Applicant: ICATCH TECHNOLOGY, INC., Hsinchu County (TW)

(72) Inventor: Jian-An Chen, Taichung (TW)

(73) Assignee: ICATCH TECHNOLOGY, INC., Hsinchu County (TW)

( * ) Notice: Subject to any disclaimer, the term of this patent is extended or adjusted under 35 U.S.C. 154(b) by 76 days.

(21) Appl. No.: 16/432,880

(22) Filed: Jun. 5, 2019

(65) Prior Publication Data

US 2020/0388045 A1 Dec. 10, 2020

(51) Int. Cl.
*G06T 7/62* (2017.01)
*G06T 7/55* (2017.01)
*H04N 5/247* (2006.01)

(52) U.S. Cl.
CPC .............. *G06T 7/62* (2017.01); *G06T 7/55* (2017.01); *G06T 2207/10012* (2013.01); *G06T 2207/10028* (2013.01); *H04N 5/247* (2013.01)

(58) Field of Classification Search
CPC ... G06T 7/62; G06T 2207/10028; G06T 7/55; G06T 2207/10012
See application file for complete search history.

(56) References Cited

U.S. PATENT DOCUMENTS

| | | | |
|---|---|---|---|
| 6,990,228 B1* | 1/2006 | Wiles | G06T 17/10 345/419 |
| 9,235,922 B2* | 1/2016 | Alj | G06T 17/10 |
| 2005/0088515 A1* | 4/2005 | Geng | G06T 7/564 348/47 |
| 2005/0151734 A1* | 7/2005 | Gubkin | G06T 9/001 345/424 |
| 2011/0007072 A1* | 1/2011 | Khan | G06T 17/00 345/420 |
| 2013/0187918 A1* | 7/2013 | Alj | G06T 15/08 345/420 |
| 2018/0165875 A1* | 6/2018 | Yu | H04N 13/296 |
| 2019/0180499 A1* | 6/2019 | Caulfield | G06T 15/06 |
| 2019/0313121 A1* | 10/2019 | Eshima | H04N 19/103 |

* cited by examiner

*Primary Examiner* — Boubacar Abdou Tchoussou
(74) *Attorney, Agent, or Firm* — Winston Hsu (57) ABSTRACT

Firstly, a measurement space is defined with a plurality of voxels. When the object is located within the measurement space, at least a depth map of the object is generated by photographing the object from at least a viewpoint. View direction and coordinates of the at least a viewpoint are also obtained. A plurality of redundant voxels, which are not belong to the object, are eliminated from the measurement space according to the at least a map, the view direction and the coordinates of the at least a viewpoint. The volume and/or the dimension of the object is calculated based on remaining voxels of the measurement space after the redundant voxels are eliminated from the measurement space.

18 Claims, 8 Drawing Sheets

METHOD AND MEASUREMENT SYSTEM FOR MEASURING DIMENSION AND/OR VOLUME OF AN OBJECT BY ELIMINATING REDUNDANT VOXELS

BACKGROUND OF THE INVENTION

1. Field of the Invention

The present invention is related to a method of measuring a dimension and/or volume of an object. More particularly, the present invention relates to a method of measuring a dimension and/or volume of an object by eliminating redundant voxels from a measurement space according to depth maps of the object.

2. Description of the Prior Art

Measuring the volume and dimension of an object is needed in many applications. For example, the size of a postal parcel and the dimension of a boarding baggage often need to be measured. The size of a livestock has to be tracked to keep its growth record. How to measure the dimension and volume of an object quickly without a physical contact is thus becoming an important issue. For example, an apparatus and methods for measuring the physical characteristics of livestock animals such as cattle and hogs may be used. However, in such scenario, a three-dimensional mesh surface image may be produced by applying a mesh algorithm to the data set in each view to convert arbitrarily-spaced point cloud data into a mesh surface with a grid coordinate system, this kind of approach is too complicated.

SUMMARY OF THE INVENTION

An embodiment of the present invention discloses a method for measuring an object. The method comprises defining a measurement space with a plurality of voxels; when the object is located within the measurement space, photographing the object from at least a viewpoint to obtain at least a first depth map of the object; obtaining a view direction and coordinates of the at least a viewpoint; eliminating redundant voxels, which are not belong to the object, from the measurement space according to the at least a depth map, the view direction and the coordinates of the at least a viewpoint; and calculating dimension and/or a volume of the object based on remaining voxels of the measurement space after the redundant voxels are eliminated from the measurement space.

An embodiment of the present invention discloses a measurement system for measuring an object. The measurement system comprises an image processor and at least a camera. The image processor is configured to define a measurement space with a plurality of voxels. The at least a camera is configured to photograph the object from at least a viewpoint to obtain at least a first depth map of the object when the object is located within the measurement space. The image processor is further configured to eliminate redundant voxels, which are not belong to the object, from the measurement space according to the at least a first depth map, a view direction and coordinates of the at least a viewpoint. The image processor is further configured to calculate dimension and/or a volume of the object based on remaining voxels of the measurement space after the redundant voxels are eliminated from the measurement space.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
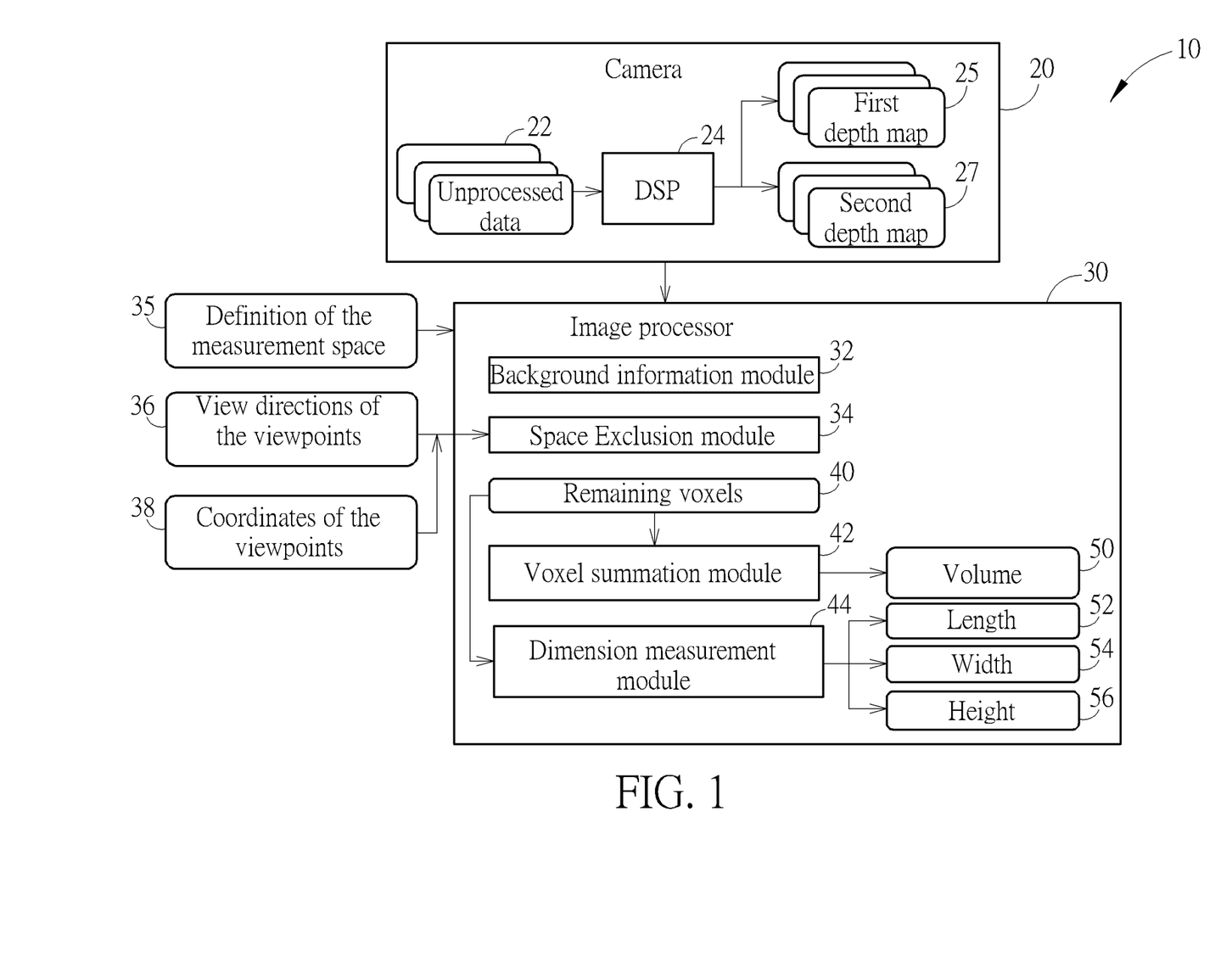
FIG. 1 is a functional block diagram of a measurement system according to an embodiment of the present invention.
Figure 2:
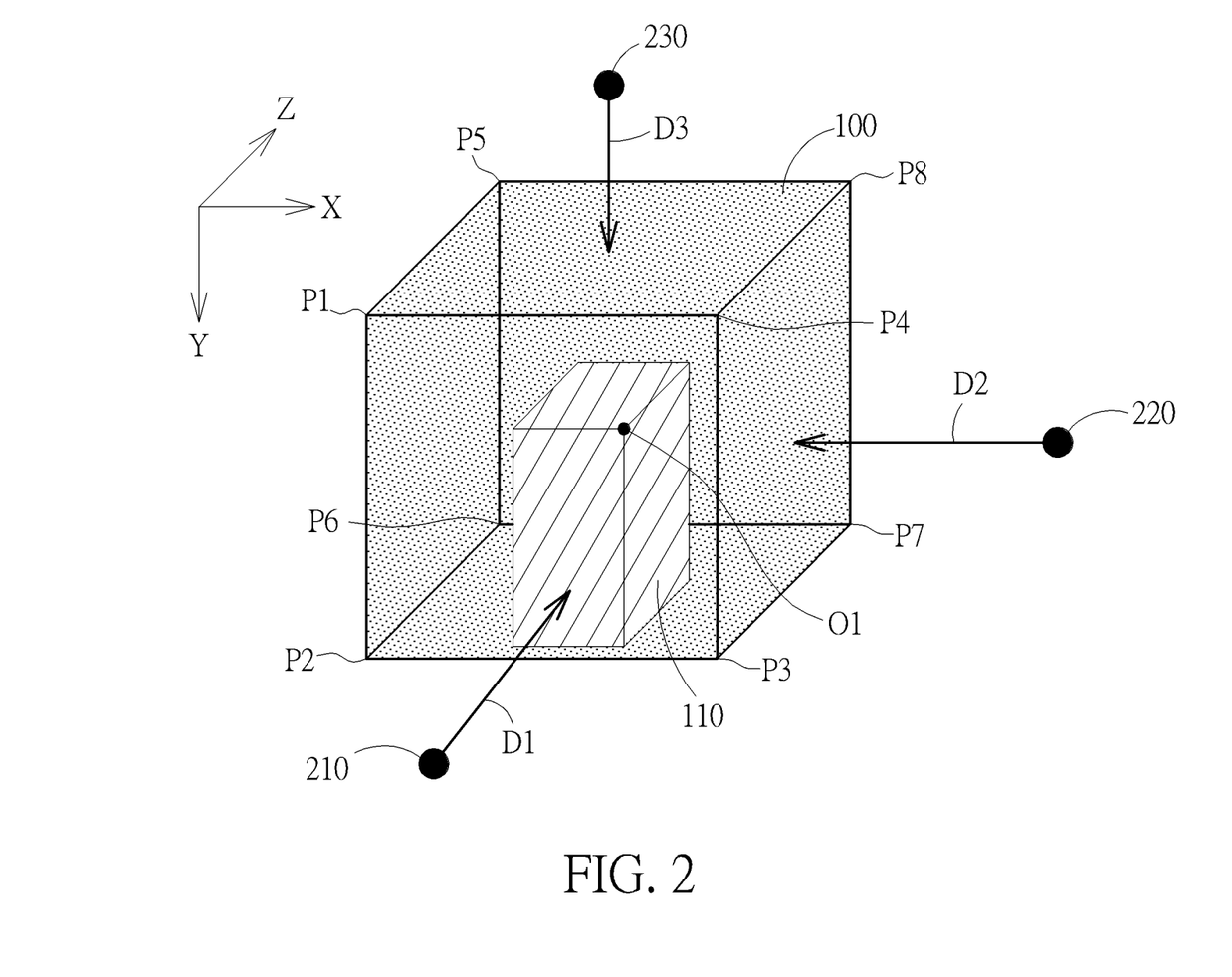
FIG. 2 is a stereoscopic diagram of the measurement system in FIG. 1 when using the measurement system to measure an object.

FIG. 1 is a functional block diagram of a measurement system 10 according to an embodiment of the present invention. FIG. 2 is a stereoscopic diagram of the measurement system 10 when using the measurement system 10 in FIG. 1 to measure an object 110. The measurement system 10 comprises at least a camera 20 and an image processor 30. The camera 20 is used to photograph the object 110 located within a measurement space 100 to generate at least a depth map 25, and the image processor 30 calculates the dimension and/or volume of the object 110 based on the at least a depth map 25.

In another embodiment, the camera 20 is used to obtain the at least three depth maps 25 at different times. However, the present invention is not limited the number of the depth maps, the number of cameras for capturing, and even the capturing timing of the cameras. For example, three or more cameras may be used to obtain the at least three depth maps 25 at the same time. In another embodiment, one of the depth maps 25 is captured at a first time, and other depth maps 25 are captured at a second time different from the first time. In another embodiment, one of the depth maps 25 is captured by a first camera, and other depth maps 25 are captured by a second camera at different times. In another embodiment, one of the depth maps 25 is captured by a first camera, and other depth maps 25 are captured by two or more second cameras at the same times. In addition, the camera 20 is a depth camera that has a digital signal processor (DSP) 24 which generates the depth maps 25 according to unprocessed data 22. When the object 110 is located in the measurement space 100, the camera 20 photographs the object 110 to generate the unprocessed data 22 at different viewpoints 210, 220 and 230 along different view directions D1, D2 and D3 at different times. Each of the depth maps 25 may be generated by the DSP 24 based on the unprocessed data 22 taken by the camera 20 at a corresponding viewpoint 210, 220 or 230 along a corresponding direction D1, D2 and D3. In an embodiment of the present invention, the depth maps 25 may be generated by the camera 20 using passive stereo photographing. However, the present invention is not limited thereto. For example, in some embodiments of the present invention, the depth maps 25 may be generated by active stereo photographing, laser scanning, using structured light, measuring time of light (TOF) or any range imaging.

Additionally, it is worthy to be noted that the more depth maps 25 obtained from more viewpoints, the more accurate the dimension and/or volume would be determined by the image processor 30.

In the embodiment, the view directions D1, D2 and D3 are perpendicular to each other. However, the present invention is not limited thereto. In other embodiments of the present invention, the dimension and volume of the object 110 could be determined by the image processor 30 even when the view directions D1, D2 and D3 are not in parallel to each other.

Moreover, in another embodiment, the DSP 24 of the camera 20 may be integrated in the image processor 30, and the camera 20 is just used to photograph the object 110 to generate the unprocessed data 22 and provide the unprocessed data 22 to the image processor 30, such that the DSP 24 integrated in the image processor 30 would generate the depth maps 25 according to the unprocessed data 22.

Figure 3:
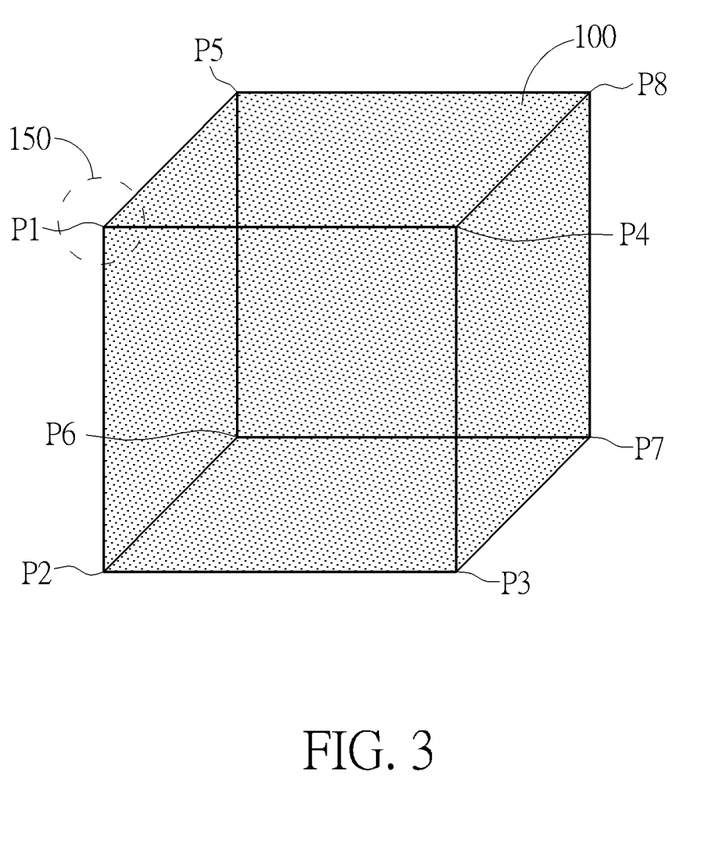
FIG. 3 is a stereoscopic diagram of a measurement space shown in FIG. 2.
Figure 4:
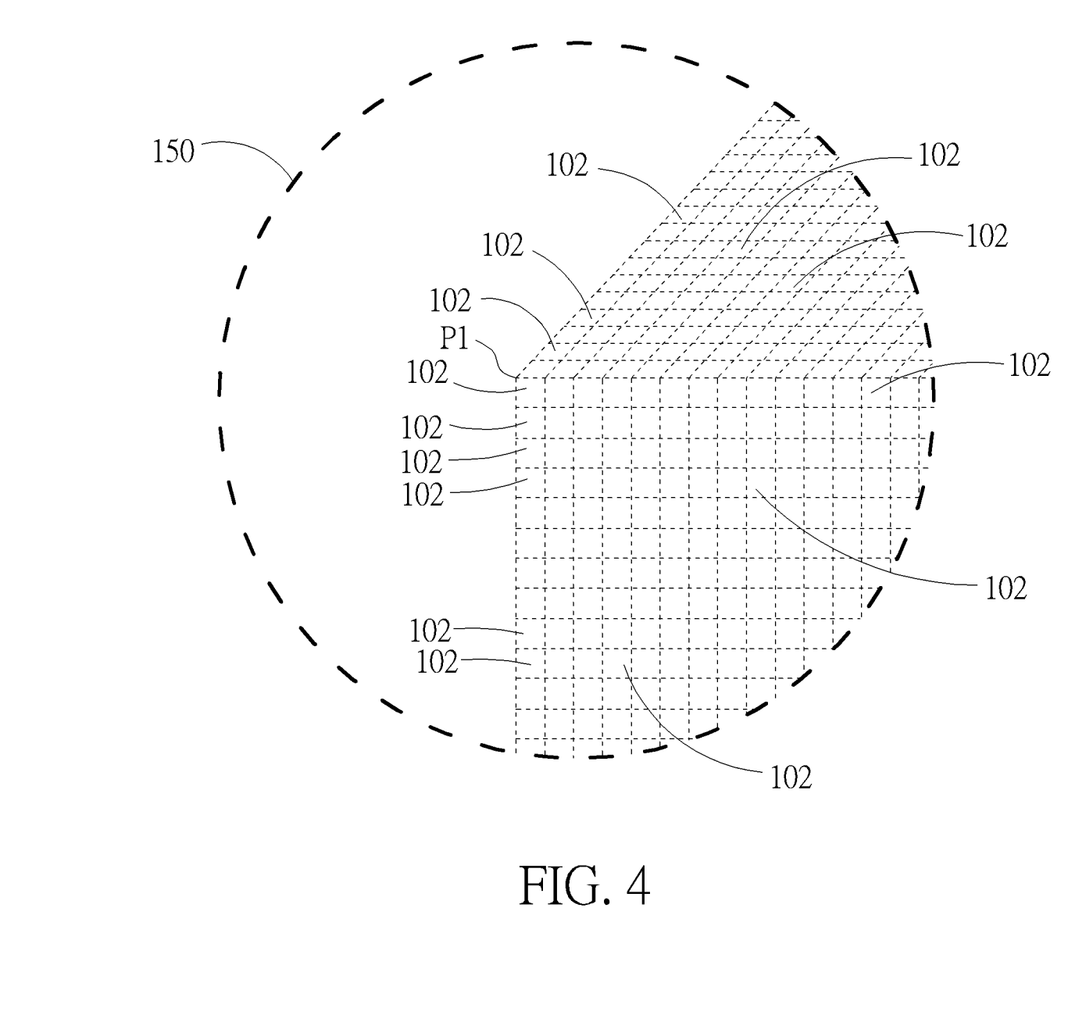
FIG. 4 is an enlarged diagram of a portion of the measurement space shown in FIG. 3.

Before using the space exclusion module 34, a user of the measurement system 10 defines the measurement space 100. FIG. 3 is a stereoscopic diagram of the measurement space 100, and FIG. 4 is an enlarged diagram of a portion 150 of the measurement space 100. The definition of the measurement space 35 may be inputted to the space exclusion module 34 by the user manually, and the image processor 30 of the measurement system 10 establishes the measurement space 100 according to definition of the measurement space 35. The measurement space 100 is established by using a plurality of voxels 102 and has eight corners P1 to P8. In general, the voxels 102 are stacked and have an identical size. However, the present invention is not limited thereto. For example, the voxels 102 may have different sizes in another embodiment of the present invention.

In the embodiment, the measurement space 100 has a cube shape. However, the present invention is not limited thereto. In other words, the measurement space 100 may has a shape different from the cube shape, e.g. a ball shape, a cylinder shape, or another shape. The shape of the measurement space 100 may be defined in the definition of the measurement space 35.

Figure 5:
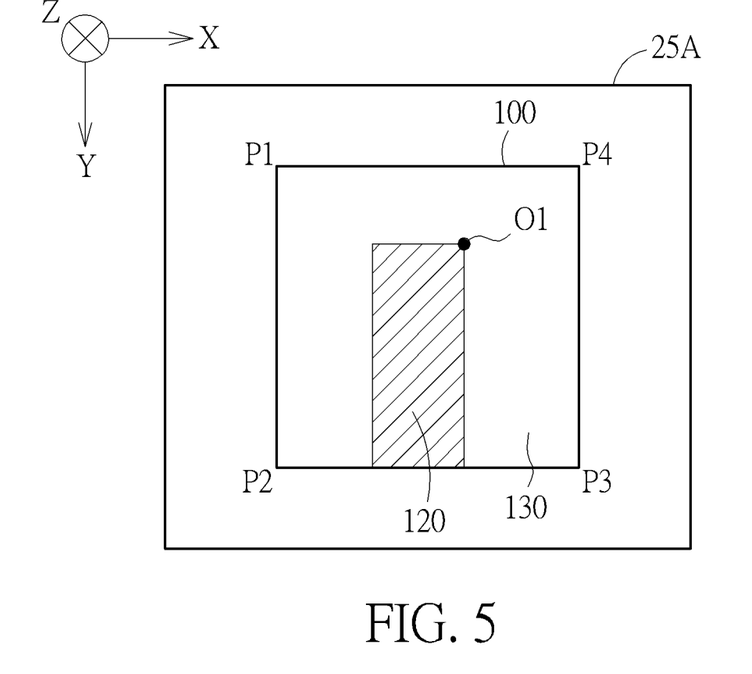
FIGS. 5 to 7 are schematic diagrams of depth maps obtained by the camera in FIG. 1 along different view directions at different viewpoints.
Figure 6:
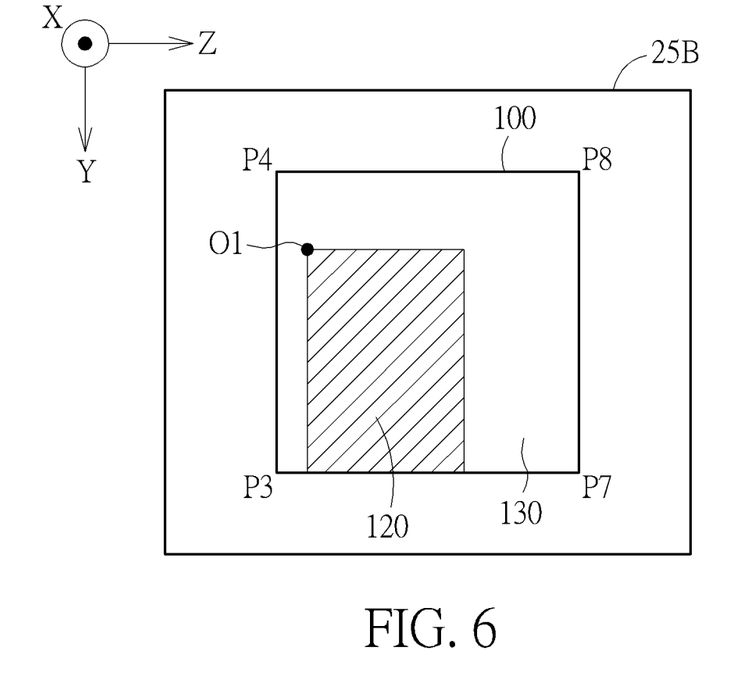
Figure 7:
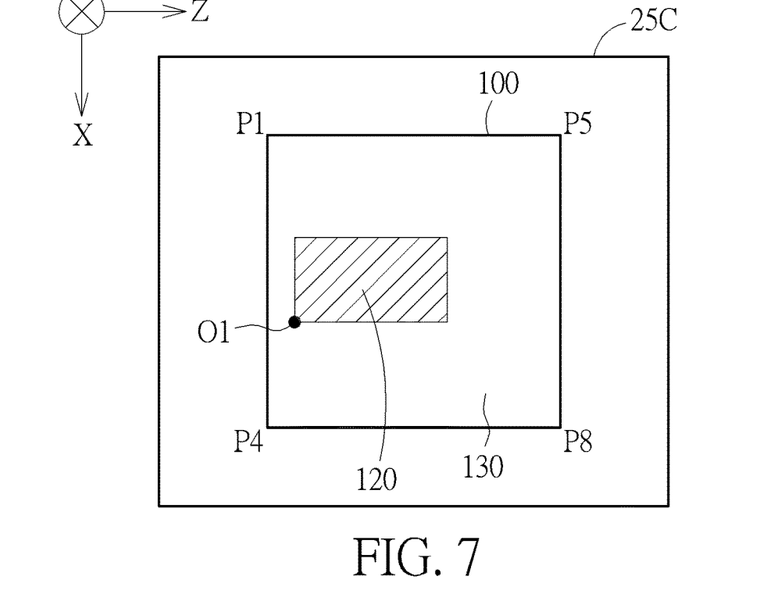

FIG. 5 is a schematic diagram of a depth map 25A of the object 110 obtained by the camera 20 along the view direction D1 at the viewpoint 210, FIG. 6 is a schematic diagram of a depth map 25B of the object 110 obtained by the camera 20 along the view direction D2 at the viewpoint 220, and FIG. 7 is a schematic diagram of a depth map 25C of the object 110 obtained by the camera 20 along the view direction D3 at the viewpoint 230. Each of the depth maps 25A, 25B and 25C contains depth information of the object 110 located within the measurement space 100. In the embodiment, each of the depth maps 25A, 25B and 25C comprises a plurality of pixels, and the depth information of the object 110 is presented by gray levels of the pixels of the depth maps 25A, 25B and 25C. A darker pixel having a low gray level has a small depth (i.e., closer to the corresponding viewpoint), and a lighter pixel having a high gray level has a greater depth (i.e., far from the corresponding viewpoint). Therefore, the image processor 30 would determine whether a voxel 102 belongs to the object 110 according to the depth information provided by the depth maps 25A, 25B and 25C.

Each of the depth maps 25A, 25B and 25C indicates an object space 120 and a redundancy space 130. The object space 120 represents a space where the object 110 is located in the view of a corresponding viewpoint 210, 220 or 230, and the redundancy space 130 represents a space located within the depth map area correspond to measurement space 100 other than the object space 120. In general, pixels of the depth maps 25A, 25B and 25C located within the object spaces 120 have a smaller depth than pixels located within the redundancy areas 130.

The space exclusion module 34 may determine which voxels 102 belong to the object 110 according to the depth maps 25A, 25B and 25C. In detail, each of the voxels 102 is associated with a corresponding pixel of the depth map 25A, a corresponding pixel of the depth map 25B, and a corresponding pixel of the depth map 25C. The corresponding voxel 102 would be determined as a redundant voxel which does not belong to the object 110 if the corresponding pixel of the depth map 25A is located within the redundancy space 130 of the depth map 25A, the corresponding pixel of the depth map 25B is located within the redundancy space 130 of the depth map 25B, or the corresponding pixel of the depth map 25C is located within the redundancy space 130 of the depth map 25C. In other words, when a voxel 102 of the measurement space 100 is corresponding to a pixel in the redundancy space 130 of any of the depth maps 25A, 25B and 25C, the voxel 102 would be determined as a redundant voxel, which is not belong to the object 110, by the space exclusion module 34. The space exclusion module 34 would eliminate all of the redundant voxels from the measurement space 100 to obtain remaining voxels 40 of the measurement space 100. Since pixels of the depth maps 25A, 25B and 25C located within the object spaces 120 have a smaller depth than pixels located within the redundancy areas 130, the space exclusion module 34 may determine which voxels 102 belong to the object 110 according to the depth information of each pixel provided by the depth maps 25A, 25B and 25C.

Figure 8:
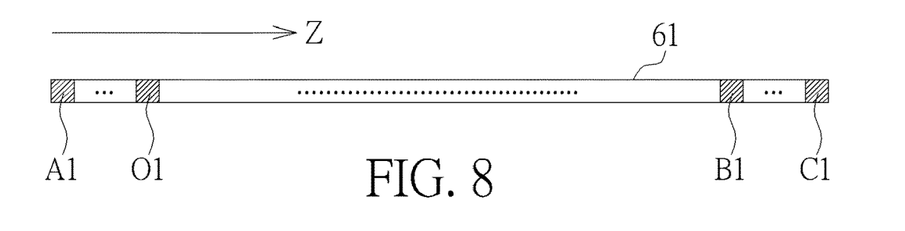
FIG. 8 is a schematic diagram of a row of voxels, which includes a corner voxel shown in FIG. 2, along the Z-axis.
Figure 9:
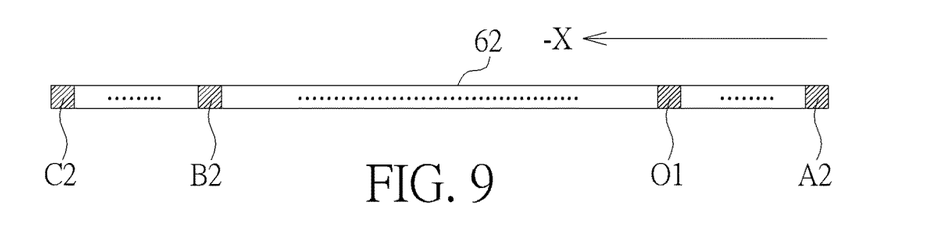
FIG. 9 is a schematic diagram of a row of voxels, which includes the corner voxel shown in FIG. 2, along the X-axis.
Figure 10:
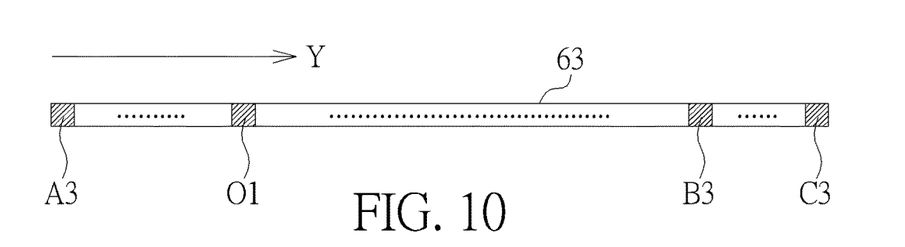
FIG. 10 is a schematic diagram of a row of voxels, which includes the corner voxel shown in FIG. 2, along the Y-axis.

FIG. 8 is a schematic diagram of a row 61 of the voxels 102, which includes a corner voxel O1 shown in FIG. 2, along the Z-axis. FIG. 9 is a schematic diagram of a row 62 of voxels 102, which includes the corner voxel O1 shown in FIG. 2, along the X-axis. FIG. 10 is a schematic diagram of a row 63 of voxels 102, which includes the corner voxel O1 shown in FIG. 2, along the Y-axis. The rows 61, 62 and 63 could be obtained by the space exclusion module 34 according to the depth information provided by the depth maps 25A, 25B and 25C. Among the voxels 102 in the row 61 shown in FIG. 8, a voxel A1 is the voxel closest to the viewpoint 210, and a voxel C1 is the voxel most far away from the viewpoint 210. The voxel A1 is located on a plane passes through the corners P1, P2, P3 and P4, the voxel C1 is located on a plane passes through the corners P5, P6, P7 and P8, and the corner voxel O1 is located between the two voxels A1 and C1. Therefore, the space exclusion module 34 may determine that voxels 102 between the voxels A1 and O1 in the row 61 are redundant voxels, which do not belong to the object 110. Relatively, the voxels 102 between the voxels O1 and C1 in the row 61 may be determined as voxels belong to the object 110 by the space exclusion module 34.

Similarly, among the voxels 102 in the row 62 shown in FIG. 9, a voxel A2 is the voxel closest to the viewpoint 220, and a voxel C2 is the voxel most far away from the viewpoint 220. The voxel A2 is located on a plane passes through the corners P3, P7, P8 and P4, the voxel C2 is located on a plane passes through the corners P1, P2, P6 and P5, and the corner voxel O1 is located between the two voxels A2 and C2. Therefore, the space exclusion module 34 may determine that voxels 102 between the voxels A2 and O1 in the row 62 are redundant voxels, which do not belong to the object 110. Similarly, voxels 102 between the voxels O1 and C2 in the row 62 may be determined as voxels belong to the object 110 by the space exclusion module 34.

In the same way, among the voxels 102 in the row 63 shown in FIG. 10, a voxel A3 is the voxel closest to the viewpoint 230, and a voxel C3 is the voxel most far away from the viewpoint 230. The voxel A3 is located on a plane passes through the corners P1, P4, P8 and P5, the voxel C3 is located on a plane passes through the corners P2, P3, P7 and P6, and the corner voxel O1 is located between the two voxels A3 and C3. Therefore, the space exclusion module 34 would determine that voxels 102 between the voxels A3 and O1 in the row 63 are redundant voxels, which do not belong to the object 110. Similarly, the voxel O1 and voxels 102 between the voxels O1 and C3 in the row 63 may be determined as voxels belong to the object 110 by the space exclusion module 34.

In another embodiment, the camera 20 may photograph a scene of the measurement space 100 from the viewpoints 210, 220 and 230 to obtain at least a depth map 27 when the object 110 is not located within the measurement space 100. Therefore, the depth map 27 may provide depth information of background in the measurement space 100, and the depth map 27 may be used by the background information module 32 of the image processor 30 to determine the position of the background in the measurement space 100, such that the space exclusion module 34 may eliminate the redundant voxels from the measurement space 100 further according to the depth map 27. In the embodiment, the background information module 32 and the pace exclusion module 34 may further determine a background voxel B1 in the row 61 according to one of the depth maps 27, which is obtained by the camera 25 from the viewpoint 210 when the object 110 is not located within the measurement space 100. When one of the depth maps 27 is obtained by the camera 20 from the viewpoint 210, the voxel B1 may be used to indicate a location where the background is located. Therefore, the space exclusion module 34 would determine that voxels 102 between the voxels A1 and O1, voxels 102 between the voxels B1 and C1, and the voxel B1 in the row 61 are redundant voxels, which do not belong to the object 110. Relatively, the voxels 102 between the voxels O1 and B1 in the row 61 may be voxels belong to the object 110.

Similarly, the background information module 32 and the pace exclusion module 34 may further determine a background voxel B2 in the row 62 according to one of the depth maps 27, which is obtained by the camera 25 from the viewpoint 220 when the object 110 is not located within the measurement space 100. When one of the depth maps 27 is obtained by the camera 20 from the viewpoint 220, the voxel B2 may be used to indicate a location where the background is located. Therefore, the space exclusion module 34 would determine that voxels 102 between the voxels A2 and O1, voxels 102 between the voxels B2 and C2, and the voxel B2 in the row 62 are redundant voxels, which do not belong to the object 110. Similarly, voxels 102 between the voxels O1 and B2 in the row 62 may be voxels belong to the object 110.

In the same way, the background information module 32 and the pace exclusion module 34 may further determine a background voxel B3 in the row 62 according to one of the depth maps 27, which is obtained by the camera 25 from the viewpoint 230 when the object 110 is not located within the measurement space 100. When one of the depth maps 27 is obtained by the camera 20 from the viewpoint 230, the voxel B3 may be used to indicate a location where the background is located. Therefore, the space exclusion module 34 would determine that voxels 102 between the voxels A3 and O1, voxels 102 between the voxels B3 and C3, and the voxel B3 in the row 63 are redundant voxels, which do not belong to the object 110. Similarly, the voxel O1 and voxels 102 between the voxels O1 and B3 in the row 63 may be voxels belong to the object 110.

In an embodiment of the present invention, the measurement space 100 may comprise voxels 102 which are belong to the background, and the space exclusion module 34 eliminates the voxels 102 belong to the background from the measurement space 100 after the object 110 is placed into the measurement space 100 and photographed by the camera 20.

In another embodiment, the image processor 30 may establish the measurement space 100 further according to the depth map(s) 27, which is obtained by the camera 20 when the object 110 is not located within the measurement space 100, so as to eliminate the voxels 102 belong to the background from the original measurement space 100 before the object 110 is placed into the measurement space 100 and photographed by the camera 20.

After the redundant voxels are eliminated from the measurement space 100 by the space exclusion module 34, a voxel summation module 42 of the image processor 30 would calculate the volume of the object 110 by summing the remaining voxels 40 of the measurement space 100, and a dimension measurement module 44 of the image processor 30 would calculate the dimension (e.g., the length 52, the width 54 and the height 56) of the object 110 based on the remaining voxels 40 of the measurement space 100.

Figure 11:
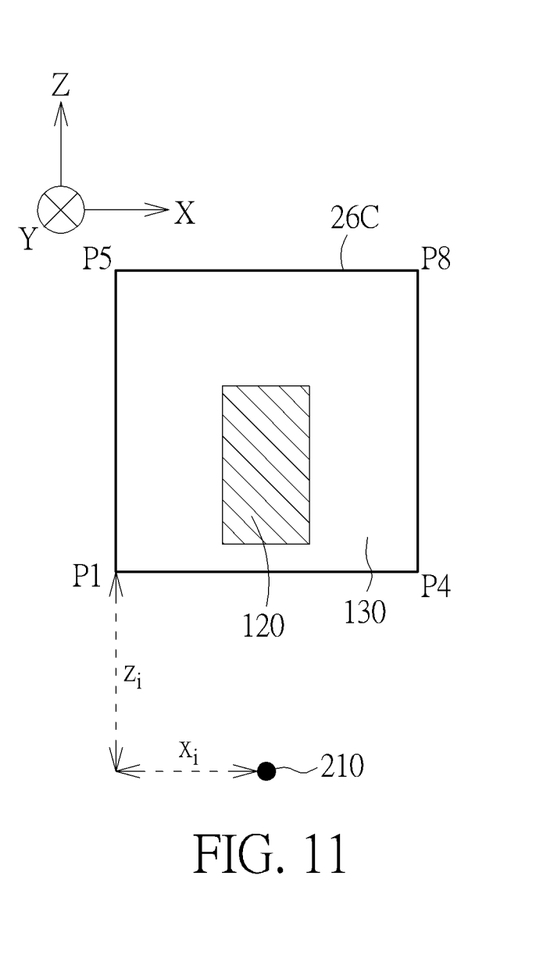
FIG. 11 is a top view of the measurement space and a viewpoint shown in FIG. 2.
Figure 12:
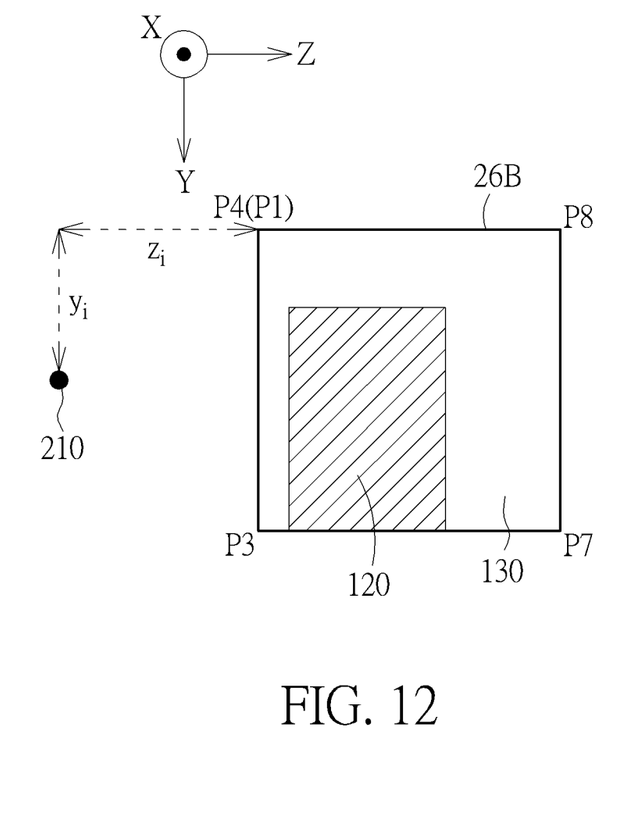
FIG. 12 is a side view of the measurement space and a viewpoint shown in FIG. 2.

In detail, the coordinates (X,Y,Z) of each voxel 102 in the measurement space 100 are determined by the image processor 30. The parameter X presents a coordinate along an X-axis shown in FIG. 2, the parameter Y presents a coordinate along a Y-axis shown in FIG. 2, and the parameter Z presents a coordinate along a Z-axis shown in FIG. 2. The image processor 30 would transform the coordinates (X,Y,Z) of each voxel 102 into coordinates $(x_i, y_i, z_i)$ for each of the viewpoints 210, 220 and 230. FIG. 11 is a top view of the measurement space 100 and the viewpoint 210 in view of the viewpoint 230. FIG. 12 is a side view of the measurement space 100 and the viewpoint 210 in view of the viewpoint 220.

Take the voxel 102 at the corner P1 in view of the viewpoint 220 for example, the parameter $x_i$ presents a horizontal distance between the voxel 102 and the corresponding viewpoint 210, the parameter $y_i$ presents a vertical distance between the voxel 102 and the corresponding viewpoint 210, and the parameter $z_i$ presents the depth of the voxel 102. The space exclusion module 34 of the image processor 30 would calculate the coordinates $(x_i, y_i, z_i)$ of each voxel 102 in view of the viewpoints 210, 220 and 230 respectively according to view directions 36 (i.e., D1, D2 and D3) and coordinates 38 of the viewpoints 210, 220 and 230. The view direction 36 and the coordinates 38 of each of the viewpoints 210, 220 and 230 may be obtained according to a corresponding depth map 25 by using a three dimensional pose estimation algorithm (for example, iteration cloud point (ICP) algorithm), or obtained via an inertial measurement unit (IMU) (for example, a gyroscope or gravity sensor) of the camera 20. In another embodiment, a user of the measurement system 10 may manually input the view direction 36 and the coordinates 38 of each of the viewpoints 210, 220 and 230 to the image processor 30.

For each voxel 102, the space exclusion module 34 would respectively calculate the voxel's coordinates $(x_i,y_i,z_i)$ in view of the viewpoint 210, the voxel's coordinates $(x_i,y_i,z_i)$ in view of the viewpoint 220, and the voxel's coordinates $(x_i,y_i,z_i)$ in view of the viewpoint 230. For the same voxel 102, the voxel's coordinates $(x_i,y_i,z_i)$ in view of the viewpoint 210, the voxel's coordinates $(x_i,y_i,z_i)$ in view of the viewpoint 220, and the voxel's coordinates $(x_i,y_i,z_i)$ in view of the viewpoint 230 are usually different. The space exclusion module 34 of the image processor 30 would determine whether a voxel 102 is a redundant voxel or not according to the coordinates $(x_i,y_i,z_i)$ of the voxel 102 in view of each viewpoint. In detail, the space exclusion module 34 determines a voxel 102 is a redundant voxel if a pixel on the coordinates $(x_i,y_i)$ is located within the redundancy space 130 of any one depth map 25, or the coordinate $z_i$ is less than the depth of the pixel on the coordinates $(x_i,y_i)$. A pseudo code of the foresaid method for measuring the volume of the object 110 is described as follows:

```
//Beginning of the pseudo code
//all voxels are remaining voxels temporarily
All voxels in the Measurement Space (MS) set 1
    for each viewpoint i
        for X = Xmin : Xmax
            for Y = Ymin : Ymax
                for Z = Zmin : Zmax
                    //coordinates transformation
                    (X, Y, Z) => (x_i, y_i, z_i) respect to each viewpoint
                    //determining whether a voxel is redundant
                    If (
                        (x_i, y_i,) ∈ pixels outside the view of depth map,
                        or
                        z_i < view(x_i, y_i,) of the depth map, or
                        z_i > view(x_i, y_i,) of the background information
                    ) {
                        //setting the current voxel as a redundant voxel
                        MS (X, Y, Z) =0
                    }
                end
            end
        end
    end
//calculating the volume by summing the remaining voxels
volume = 0
    for X = Xmin : Xmax
        for Y = Ymin : Ymax
            for Z = Zmin : Zmax
                If (MS (X,Y, Z) ==1) {
                    volume = volume +1
                }
            end
        end
    end
//calculating the dimension by scanning the remaining voxels
widthMax = Xmin
widthMin = Xmax
heightMax = Ymin
heightMin = Ymax
lengthMax = Zmin
lengthMin = Zmax
    for X = Xmin : Xmax
        for Y = Ymin : Ymax
            for Z = Zmin : Zmax
                If (MS(X,Y,Z)==1) {
                    if (widthMax<x) { widthMax = x }
                    if (widthMin>=x) { widthMin = x }
                    if (heightMax<y) { heightMax = y }
```

-continued

```
                    if (heightMin>=y) { heightMin = y }
                    if (lengthMax<z) { lengthMax = z }
                    if (lengthMin>=z) { lengthMin = z }
                }
            end
        end
    end
    width = widthMax - widthMin +1;
    height = heightMax - heightMin +1;
    length= lengthMax - lengthMin +1;
//End of the pseudo code
```

Figure 13:
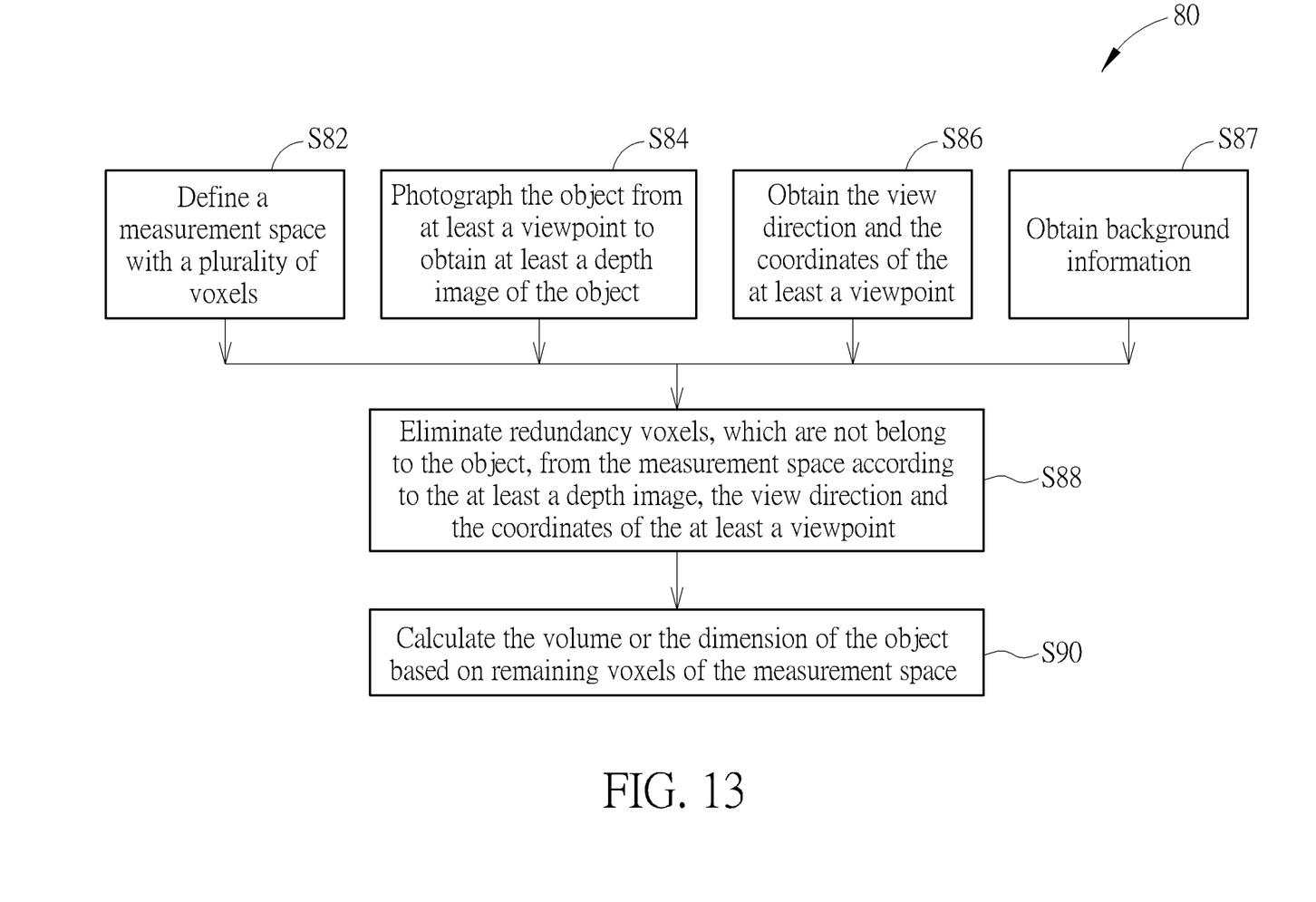
FIG. 13 is a flow chart of a method for measuring the dimension and/or the volume of an object according to an embodiment of the present invention.

FIG. 13 is a flow chart of a method 80 for measuring the dimension and/or the volume of an object according to an embodiment of the present invention. The method 80 comprises the following steps:

Step S82: Defines the measurement space 100 with a plurality of voxels 102;

Step S84: The camera 20 photographs the object 110 from at least a different viewpoint 210, 220 or 230 to obtain at least a depth image 25 of the object 110;

Step S86: The image processor 30 obtains the view directions 36 and the coordinates 38 of the at least a viewpoint 210, 220 or 230;

Step S87 (optional): The image processor 30 may obtain the background information via the background information module 32;

Step S88: The space exclusion module 34 of the image processor 30 eliminates redundant voxels, which are not belong to the object 110, from the measurement space 100 according to the at least a depth image 25, the view direction 36 and the coordinates 38 of the at least a viewpoint 210, 220 or 230; and Step S90: The voxel summation module 42 of the image processor 30 calculates the length 52, the width 54, the height 56 and/or the volume 50 of the object 110 based on the remaining voxels 42 of the measurement space 100.

It should be noted that step S87 is an optional step, and the image processor 30 may determine whether to perform step S87 according to actual requirements of measuring the object 110.

As compared to the prior art, since the method of the present invention calculates the dimension and/or the volume of the object by eliminating the redundant voxels from the measurement space according to the depth maps, the algorithms of the present invention are simple and efficient. Accordingly, speed of calculating the dimension and/or the volume of the object is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of measuring an object, comprising:
   defining a measurement space with a plurality of voxels;
   when the object is located within the measurement space, photographing the object from at least a viewpoint to obtain at least a first depth map of the object;
   obtaining a view direction and coordinates of the at least a viewpoint;
   eliminating redundant voxels, which are not belong to the object, from the measurement space according to gray levels of pixels of the at least a first depth map, the view direction and the coordinates of the at least a viewpoint;

calculating a dimension and/or a volume of the object based on remaining voxels of the measurement space after the redundant voxels are eliminated from the measurement space; and photographing a scene of the same measurement space from the at least a viewpoint to obtain at least a second depth map when the object is not located within the same measurement space;

wherein the redundant voxels are eliminated from the measurement space further according to the at least a second depth map.

2. The method of claim 1, wherein photographing the object from the at least a viewpoint to obtain the at least a first depth map of the object comprises:

photographing the object from at least three different viewpoints to obtain at least three first depth maps of the object;

wherein obtaining the view direction and coordinates of the at least a viewpoint comprises:

obtaining view directions and coordinates of the at least three viewpoints;

wherein eliminating the redundant voxels from the measurement space comprises:

eliminating the redundant voxels from the measurement space according to the at least three first depth maps, the view directions and the coordinates of the at least tree viewpoints.

3. The method of claim 2, wherein the at least three first depth maps of the object are obtained by using a single camera at different times.

4. The method of claim 2, wherein the at least three first depth maps of the object are obtained by using at least three cameras at the same time.

5. The method of claim 2, wherein the view directions of the at least three different viewpoints are not in parallel to each other.

6. The method of claim 2, wherein the view directions of the at least three different viewpoints are perpendicular to each other.

7. The method of claim 1, wherein the view direction and the coordinates of the at least a viewpoint are obtained according to the at least a first depth map by using a three dimensional pose estimation algorithm, or obtained via an inertial measurement unit (IMU).

8. The method of claim 1, wherein the at least three depth maps are obtained by passive stereo photographing, active stereo photographing, laser scanning, using structured light, measuring time of light (TOF), or any range imaging.

9. The method of claim 1, wherein the voxels have an identical size.

10. A measurement system for measuring an object, the measurement system comprising:

an image processor, configured to define a measurement space with a plurality of voxels; and at least a camera, configured to photograph the object from at least a viewpoint to obtain at least a first depth map of the object when the object is located within the measurement space;

wherein the image processor is further configured to eliminate redundant voxels, which are not belong to the object, from the measurement space according to gray levels of pixels of the at least a first depth map, a view direction and coordinates of the at least a viewpoint;

wherein the image processor is further configured to calculate a dimension and/or a volume of the object based on remaining voxels of the measurement space after the redundant voxels are eliminated from the measurement space; and wherein the image processor is further configured to photograph a scene of the same measurement space from the at least a viewpoint to obtain at least a second depth map when the object is not located within the same measurement space, and the image processor eliminates the redundant voxels from the measurement space further according to the at least a second depth map.

11. The measurement system of claim 10, wherein the at least a camera is configured to photograph the object from at least three different viewpoints to obtain at least three first depth maps of the object when the object is located within the measurement space; and wherein the image processor eliminates the redundant voxels from the measurement space according to the at least three first depth maps, view directions and coordinates of the at least three different viewpoint.

12. The measurement system of claim 11, wherein the at least a camera is a single camera, and the at least three first depth maps of the object are obtained by using the single camera at different times.

13. The measurement system of claim 11, wherein the at least a camera comprises a plurality of cameras, and the at least three first depth maps of the object are obtained by using the cameras at the same time.

14. The measurement system of claim 11, wherein the view directions of the at least three different viewpoints are not in parallel to each other.

15. The measurement system of claim 11, wherein the view directions of the at least three different viewpoints are perpendicular to each other.

16. The measurement system of claim 10, wherein the view direction and the coordinates of the at least a viewpoint are obtained according to the at least a first depth map by using a three dimensional pose estimation algorithm, or obtained via an inertial measurement unit (IMU).

17. The measurement system of claim 10, wherein the at least three depth maps are obtained by passive stereo photographing, active stereo photographing, laser scanning, using structured light, measuring time of light (TOF), or any range imaging.

18. The measurement system of claim 10, wherein the voxels have an identical size.

* * * * *